May 8, 1945. J. H. JOHNSON 2,375,368
PROFILING ATTACHMENT FOR LATHES
Filed Nov. 30, 1942 4 Sheets-Sheet 1

Inventor
Joseph H. Johnson
Wright, Brown, Quinby & May
Attys.

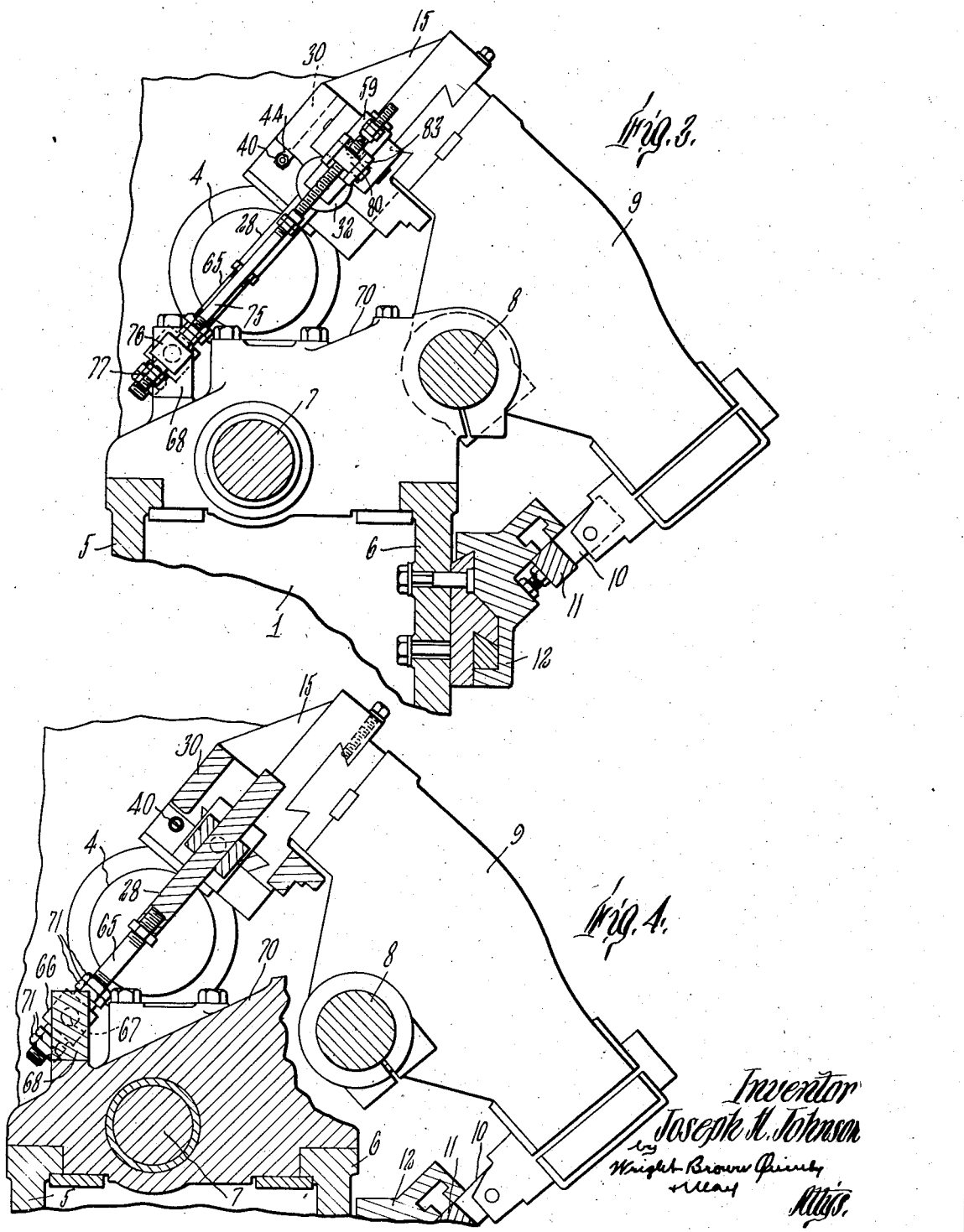

May 8, 1945. J. H. JOHNSON 2,375,368
PROFILING ATTACHMENT FOR LATHES
Filed Nov. 30, 1942 4 Sheets-Sheet 3

Inventor
Joseph H. Johnson
by Wright, Brown, Quinby & May
Attys.

May 8, 1945.  J. H. JOHNSON  2,375,368
PROFILING ATTACHMENT FOR LATHES
Filed Nov. 30, 1942   4 Sheets-Sheet 4

Inventor
Joseph H. Johnson

Patented May 8, 1945

2,375,368

UNITED STATES PATENT OFFICE 2,375,368

PROFILING ATTACHMENT FOR LATHES

Joseph H. Johnson, Springfield, Vt., assignor to Jones & Lamson Machine Company, Springfield, Vt., a corporation of Vermont Application November 30, 1942, Serial No. 467,325

7 Claims. (Cl. 82—14)

This invention relates to attachments for lathes and has for an object to provide such an attachment, more particularly applicable to lathes of the well known Fay type, by which the end of a work piece held by the lathe headstock spindle may be shaped to any desired contour. Lathes of the Fay type employ tool-carrying arms supported on longitudinally extending tool bars about the axes of which the arms rock to bring tools carried by these arms toward and from the work axis.

In accordance with the present invention as applied to such lathes, the profiling mechanism is carried by one of these arms.

A further object of the invention as applied to the Fay lathe is to provide such an attachment wherein the contour to be formed on the end of the work piece is determined by that of a removable former cam, so that it is an easy matter by choice of former cams to produce any of a great variety of end contours.

Another object is to provide such an attachment whereby the cutting of the contour is produced on motion of the cutting tool toward the axis of the work, the reverse direction of motion taking place while the tool is out of contact with the work.

Still another object is to provide a trigger mechanism by which the tool is quickly removed from the work at the end of the inward travel of the tool so that it is out of contact with the work as it is moved outwardly.

Further objects and advantages will appear from a description of an embodiment of the invention shown in the accompanying drawings in which Figure 1 is a fragmentary front elevation of a Fay lathe showing the attachment in retracted position.

Figure 2 is a rear view of a portion of the machine shown in Figure 1.

Figures 3 and 4 are detail sectional views on lines 3—3 and 4—4, respectively, of Figure 1.

Figure 5:
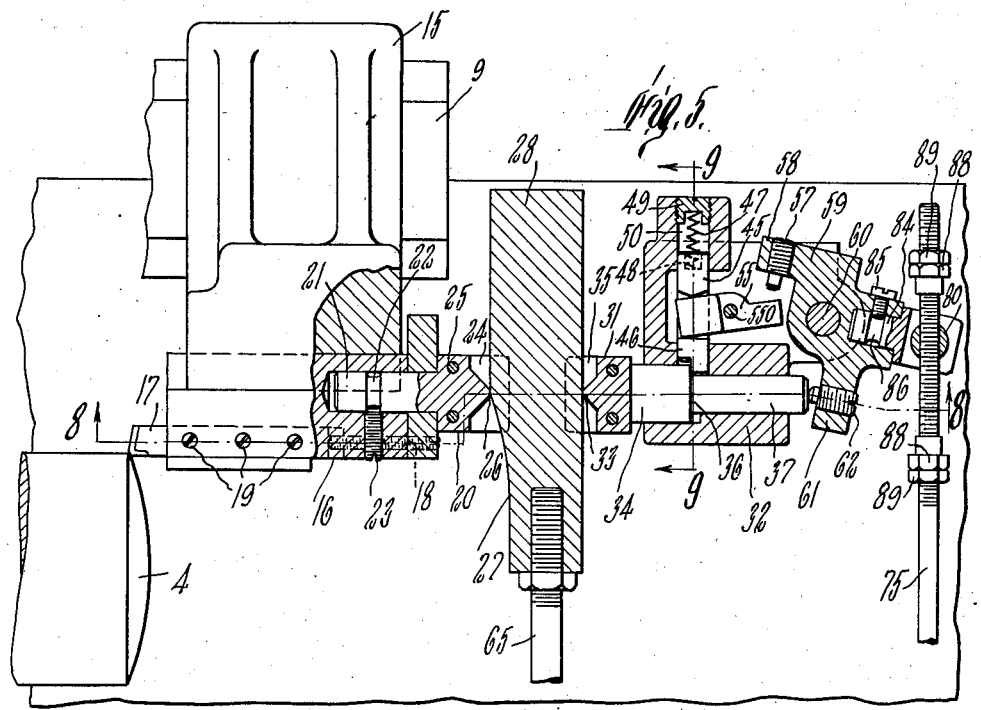
Figure 5 is a view partly in elevation partly broken away and in section showing the attachment and the end portion of the work, the attachment being in the position where it has just started a cut.
Figure 8:
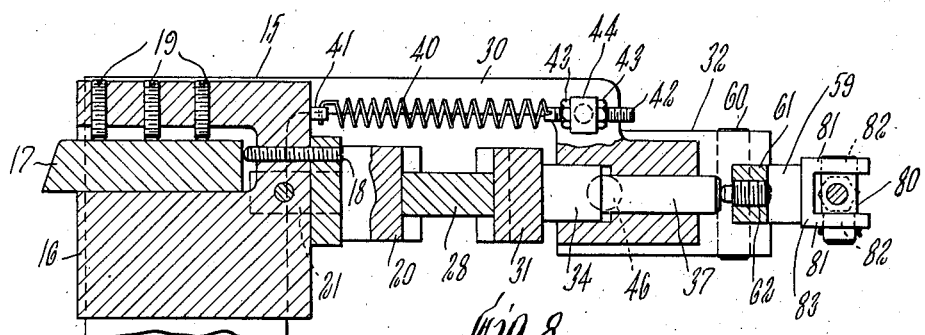
Figure 9:
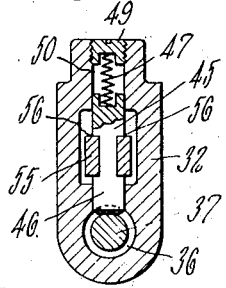

Figures 8 and 9 are detail sectional views on lines 8—8 and 9—9, respectively, of Figure 5.

Figures 1, 2:
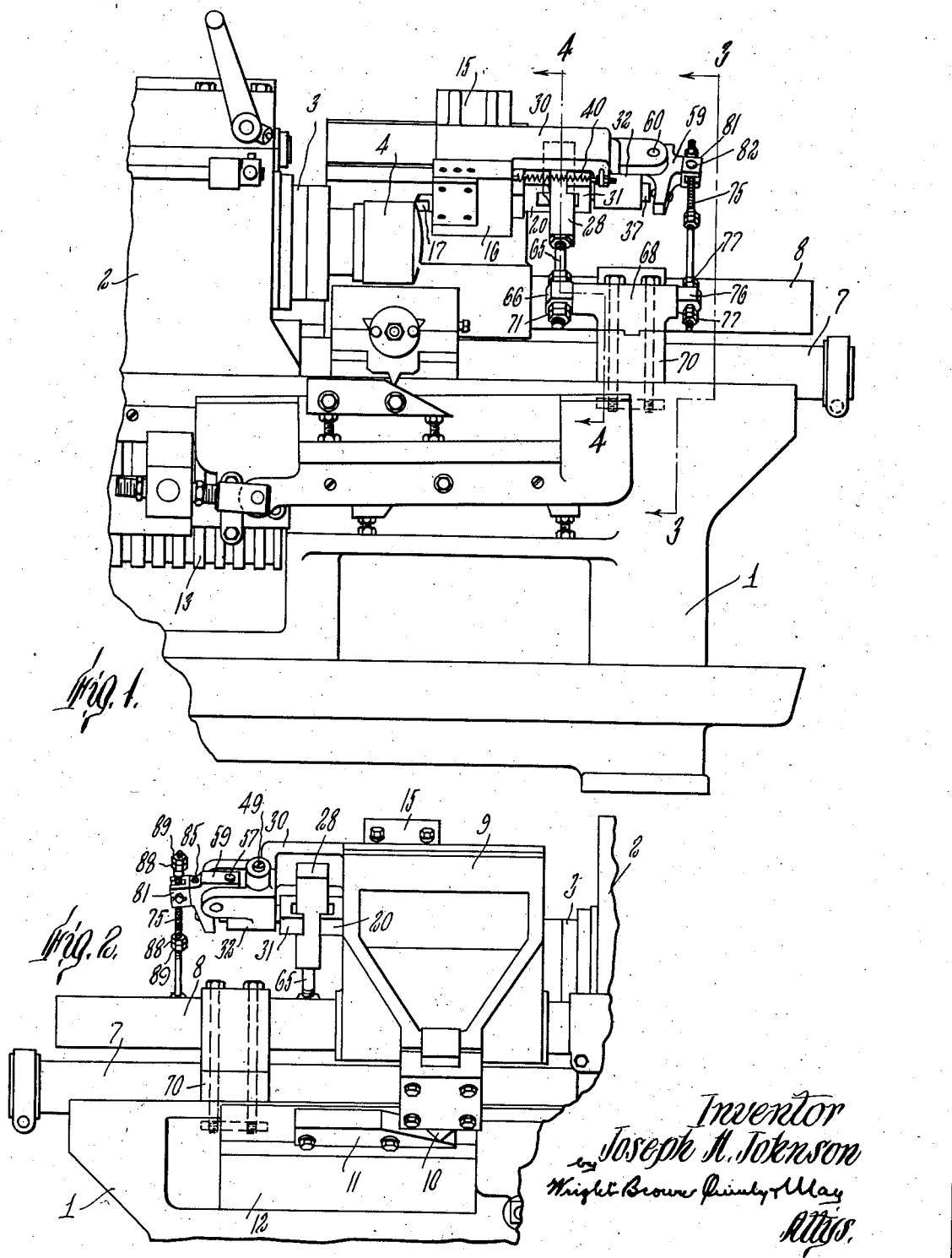

Referring first to Figures 1, 2, 3 and 4, there is illustrated a portion of a Fay lathe having a bed 1 supporting at one end a headstock 2 having a rotary work carrying spindle 3 which may carry a work piece 4 by any suitable chucking means. Between the front and back walls 5 and 6 of the bed 1 there is shown the usual front tool bar 7 and above and slightly back of the frame portion 6 is shown the rear tool bar 8. As is well known in the art, these tool bars are circular in cross section and are rockably supported in the machine frame, and one or more of them may also be capable of longitudinal motion, but for present purposes no longitudinal motion is employed. To the back tool bar 8 is clamped a tool arm 9, and the tool attachment of the present invention is carried by the upper end of this arm 9. It is arranged to be rocked about the axis of the bar 8 and for this purpose its rear lower end carries a follower 10 supported upon a former cam 11 adjustably secured to a carriage 12 which may be moved axially of the machine, as by cams (not shown) on a cam drum 13 beneath the headstock of the machine. Similar mechanism is illustrated in Figure 1 for controlling the angular position of a tool bar carried by the front bar 7, but as the particular tools and control for this front tool bar forms no part of the present invention, it need not be further described here.

The upper end of the back arm 9 has attached thereto a bracket 15 on which is slidable substantially parallel to the axis of the work spindle and to that of the tool bars, a tool carrier or support 16 to which may be clamped an end profiling tool 17. The axial position of this tool with respect to the support 16 may be adjusted by means of the adjusting screw 18 which engages the rear end of the tool and it may be tightened in adjusted position by means of the set screws 19 (see Figure 8).

To the face of the tool carrier 16 remote from the work is secured a cam follower 20. This cam follower is shown as provided with a shank 21 having a peripheral groove 22 therein (see Figure 5) within which may be engaged the inner end of a set screw 23. This permits the abutment to rock about the axis of its shank. Its head portion has secured to opposite sides, as by bolts 25, guide plates 24 which extend beyond a follower nose 26 adapted to engage a contoured face portion 27 of a former cam 28, the plates 24 riding on opposite sides of the former cam 28 and thus holding the follower in proper angular position for its nose to properly bear against the face of the former cam. The bracket 15 is provided with an extension 30 which passes over the follower, the former cam, and an abutment 31 and terminates in a latch block 32. The abutment 31 is formed with a nose 33 for engagement with the former cam 28 and upper and lower guide plates 35 between which the former cam 28 rides, and it is rockably supported in the latch block 32. It has a shank portion provided with an enlarged diameter part 34 and a reduced diameter end part 37, which define between them an annular latch shoulder 36. The tool carrier 16 is normally urged away from the headstock so as to hold the tool 17 retracted from the work by means of a coil spring 40 (see particularly Figure 8) which is hooked at one end into a part 41 of the tool support, and the other end of which is secured to a threaded rod 42 adjustably secured as by nuts 43 engaging opposite sides of a block 44 carried by the extension 30 adjacent to the latch block 32, but the tool carrier may be held in its operative position toward the work by means of a latch 45 guided for axial motion in spaced portions of the latch block 32 and having an end portion 46 which may be projected back of the shoulder 36 of the abutment in the position shown in Figure 5. This latch 45 is normally urged into latching position as by a spring 47 engaging in a socket 48 in its rear end, and reacting against a plug 49 threaded in the outer end of a socket 50 in which the rear portion of the latch is slidable. The latch may be retracted, however, by means of a trigger lever 55 pivoted at 550 and having a forked forward end which engages in opposed cut away portions 56 in opposite sides of the latch 45. This lever 55 may be moved to withdraw the bolt by the impingement on its outer end of an adjustable plug 57 supported in one arm 58 of a bell crank lever 59 pivoted between side wall members of the latch block on a fulcrum pin 60. The bell crank lever 59 has a resetting arm 61 provided with an adjustable screw 62 similar to the screw 57, and which may be brought against the outer end of the abutment portion 37 and press this abutment forwardly to a point where the latch portion 46 may be projected behind the shoulder 36 so as to latch the tool carrier with the former cam 28, and the abutment in operative axial positions.

Figure 7:
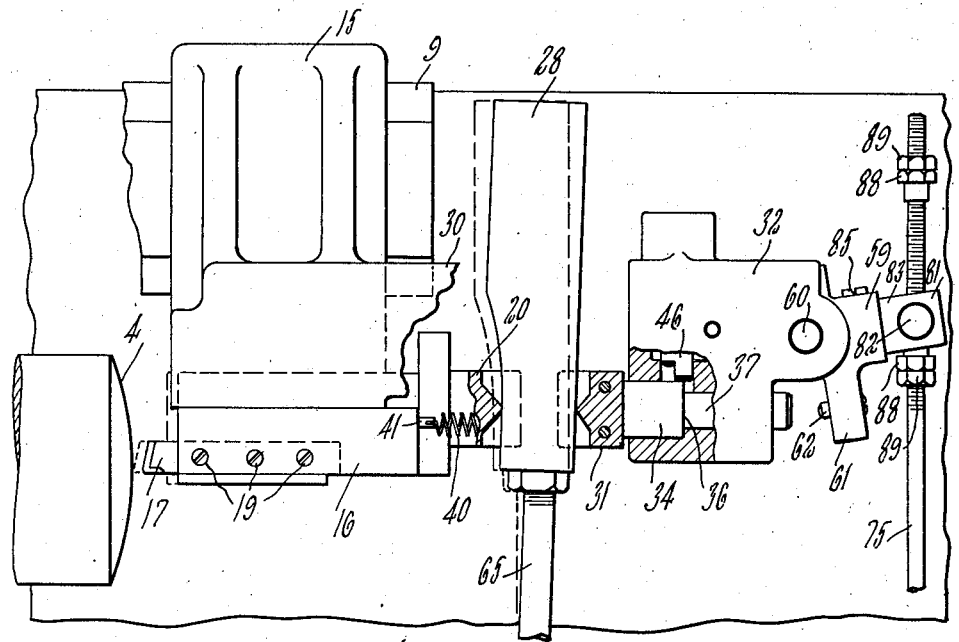
Figure 7 is a view somewhat similar to Figure 6, but showing the tool retracted.

The former cam 28 does not partake of the rocking motion of the back tool arm, but it is permitted a motion substantially axial of the work between the follower 20 and the abutment 31, and for this purpose it is carried at the rear end of a rod 65, the forward end of which is adjustably secured to a block 66 pivoted on a shank 67 to one end portion of a bracket 68 which may be clamped to a cross frame member 70 of the machine frame. The forward end of the rod 65 is threaded, and adjusting and check nuts 72 thereon on each side of the block 66 serve to secure this rod in adjusted position. This connection of the former cam is sufficiently flexible to permit the former cam to yield laterally, as shown by the full and dotted lines in Figure 7, in accordance with whether the tool carrier is advanced during the cutting of the work or retracted from the work during the backward swing of the rear tool arm as it rocks about the axis of the rear tool bar.

The bell crank lever 59, previously described, which acts both as a tripping member for the latch and as a resetting member for the abutment, the former cam 28, and the tool carrier, is arranged to be operated to release the tool carrier to cause the tool to retract when the back tool arm has been rocked forwardly to a point where the tool 17 is substantially at the work axis, and this lever is rocked to reset the tool in operative position when the tool arm approaches its rearward limit of motion. For this purpose the lever 59 is shown as provided with an operative connection to an actuating rod 75, the forward end of which is secured to the opposite end of the fixed bracket 68. Connection to this bracket may comprise a block 76 pivoted thereto as is the block 66. The forward end of the rod 75 extends through this block 76, this end being threaded for the reception of adjusting and check nuts 77.

Due to the rocking motion of the back tool bar and the pivotal mounting of the bell crank lever 58, the operative connection between the rod 75 and this bell crank lever must provide for rocking in two planes. To this end, the rear threaded extremity of the rod 75 passes through a block 80 pivoted between the jaws 81 on a pivot 82, the jaws 81 forming the head portion of a member 83 provided with a shank 84 pivotally mounted in a portion of the bell crank lever 59 and held in position therein as by a screw 85 engaging in an annular groove 86 in the shank 84. Threaded on the rear portion of the rod 75 in spaced relation are the abutment nuts 88 which may contact with the block 80 at suitable times during the rocking of the back tool arm depending upon the adjustments of these nuts 88. Check nuts 89 may be employed to secure the abutment nuts 88 in the desired adjusted position.

Figure 6:
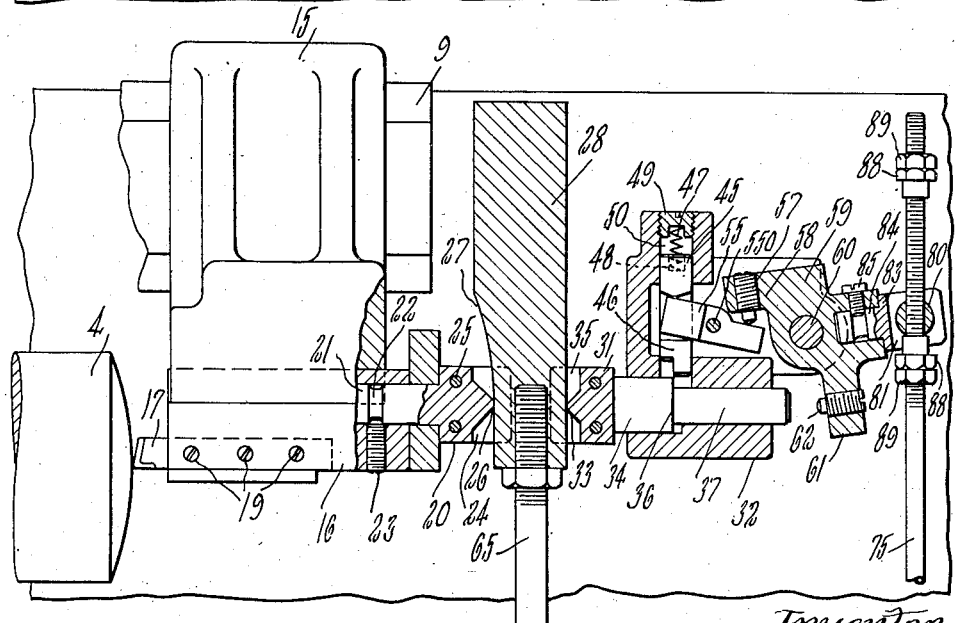
Figure 6 is a view somewhat similar to Figure 5, but showing the position of the parts when the tool is almost at the inner end of the cut and the tool is about to be retracted.

In operation of this attachment, assuming that the back arm 9 has swung forwardly from the fully retracted position of Figure 1 to the position of Figure 5, the tool being just at the outer edge of the work piece and with the abutment locked in the position shown and the follower nose 26 at the start of the contoured portion of the former cam 28, as the back arm continues to rock forwardly, the follower nose rides along the contour portion of the former cam 28, causing the tool 17 to take a correspondingly shaped path until the parts reach the position of Figure 6, at this time the forward nut 88 of the rod 75 contacts the block 80, rocking the bell crank lever 59 and retracting the latch 45. When this latch is retracted sufficiently to release the abutment 36, the spring 40 snaps the tool carrier to the right into the position shown in Figure 7, taking with it the cam follower, the former cam, and the abutment. The tool is thus retracted from the work. The back tool arm then is rocked rearwardly, returning the tool toward its rearward position and out of contact with the work. This takes place until the back nut 88 contacts with the block 80 and rocks the bell crank lever 59 to the position shown in Figure 5, forcing the abutment to the left and moving it and the former cam and its follower and the tool carrier to the axial position shown in Figure 5, although it will be understood that at this time the tool carrier is rocked backwardly from the work further than is shown in Figure 5. This resets the tool for another forming operation. The tool carrier is then rocked forwardly into the position shown in Figure 5 for the start of a succeeding forming cut on another work piece. Other tools for operating on the periphery of the work may also be carried by the back tool bar to the left of the profiling attachment as viewed in Figure 1, if desired.

From the foregoing description of an embodiment of this invention, it should be evident to those skilled in the art that various changes and modifications might be made without departing from the spirit or scope of this invention.

I claim:

1. The combination with a rotary work spindle having means for supporting a work piece, of mechanism including a tool carrier movable transversely of the axis of said spindle, a former cam with reference to which said tool carrier moves as said tool carrier moves transverse to said axis, a tool support mounted on said carrier for motion therewith and parallel to said axis and having a follower movable along and in contact with said former cam, means for moving said tool carrier to bring a tool on said tool support toward and from said axis, an abutment engageable with said former cam substantially opposite to said follower and between which abutment and follower said former cam is positioned, means engaging said tool support tending to move said tool support, follower, and abutment away from work carried by said spindle, a latch for retaining said abutment with the tool in operative position, and means effective when said tool reaches a predetermined point relative to the work axis to release said latch and to permit said abutment, former cam, follower, and tool support to be retracted by said engaging means.

2. The combination with a rotary work spindle having means for supporting a work piece, of mechanism including a tool carrier movable transversely of the axis of said spindle, a former cam with reference to which said tool carrier moves as said tool carrier moves transverse to said axis, a tool support mounted on said carrier for motion therewith and parallel to said axis and having a follower movable along and in contact with said former cam, means for moving said tool carrier to bring a tool on said tool support toward and from said axis, an abutment engageable with said former cam substantially opposite to said follower and between which abutment and follower said former cam is positioned, means engaging said tool support tending to move said tool support, follower, and abutment away from work carried by said spindle, a latch for retaining said abutment with the tool in operative position, means effective when said tool reaches a predetermined point relative to the work axis to release said latch and to permit said abutment, former cam, follower, and tool support to be retracted by said engaging means, and means effective when said tool approaches fully retracted position from said axis to return and latch said abutment, former cam, and tool support in operative position.

3. The combination with a rotary work spindle having means for supporting a work piece, of mechanism including a tool support having a cam follower and an abutment substantially in line with said follower, said tool support, follower and abutment being movable transverse to the axis of said spindle, a former cam positioned between said follower and abutment, means supporting said former cam against substantial motion transverse to said axis but movable substantially parallel to said axis, yielding means tending to move said tool, tool support, follower, former cam, and abutment away from operative relation between a tool carried by said tool support and a work piece carried by said work supporting means, a latch for preventing such motion by said yielding means, means for moving said mechanism to bring a tool on said tool support toward and from said spindle axis, and means actuable to trip said latch when said tool reaches a predetermined point relative to said axis to thereby permit said tool to be withdrawn by said yielding means from operative engagement with the work.

4. The combination with a rotary work spindle having means for supporting a work piece, of mechanism including a tool support having a cam follower and an abutment substantially in line with said follower, said tool support, follower and abutment being movable transverse to the axis of said spindle, a former cam positioned between said follower and abutment, means supporting said former cam against substantial motion transverse to said axis but movable substantially parallel to said axis, yielding means tending to move said tool, tool support, follower, former cam, and abutment away from operative relation between a tool carried by said tool support and a work piece carried by said work supporting means, a latch for preventing such motion by said yielding means, means for moving said mechanism to bring a tool on said tool support toward and from said spindle axis, means actuable to trip said latch when said tool reaches a predetermined point relative to said axis to thereby permit said tool to be withdrawn by said yielding means from operative engagement with the work, and means for returning the parts moved by said yielding means to tool operative and latched position when said mechanism approaches fully retracted position with relation to said axis.

5. In a lathe provided with a rotary work spindle having means for supporting work, a tool bar having an arm thereon rockable about the axis of said bar transverse to the axis of said spindle, and means for rocking said arm, a tool support carried by one end portion of said arm for motion relative to said arm substantially parallel to said axis, a tool carried by said tool support for operating on work held by said work supporting means and movable by the swinging of said arm toward and from said axis, a latch block carried by said arm, an abutment carried by said latch block for motion substantially parallel to said axis and disposed opposite to said follower, a former cam between said follower and abutment, means for securing said former cam against motion transverse to said axis but yieldable substantially parallel thereto, spring means secured to said tool support and arm tending to retract said tool support parallel to said axis, a latch carried by said latch block for holding said tool support, said follower, said former cam, and said abutment advanced with a tool carried by said tool support in operative relation to work, a lever pivoted to said latch block and having a latch-releasing arm and an abutment advancing arm, and an operative lost motion connection between said lever and a fixed point for rocking said lever to release said latch when said arm has been rocked in a direction to bring the tool to a predetermined point relative to said spindle axis to cause said tool to be retracted from the work, and for rocking said lever to advance said abutment and tool and reset said latch when said arm approaches its retracted limit of motion, the position of said tool intermediate to said point and retracted positions being controlled by the contour of said former cam.

6. The combination with a rotary work spindle having means for supporting a work piece, of mechanism including a tool carrier rockable transversely of the axis of said spindle, means to rock said tool carrier, a tool on said carrier, means for moving said tool in a predetermined path as said mechanism is rocked in a direction to bring said tool toward the work axis, and means including a trigger mechanism for moving said tool axially of the work away from the work when said tool reaches a predetermined point.

7. The combination with a rotary work spindle having means for supporting a work piece, of mechanism including a tool carrier rockable transversely of the axis of said spindle, means to rock said tool carrier, a tool on said carrier, means for moving said tool in a predetermined path as said mechanism is rocked in a direction to bring said tool toward the work axis, means including a trigger mechanism for moving said tool axially of the work away from the work when said tool reaches a predetermined point, and means for returning said tool to its former position when said tool carrier is rocked away from said axis to a predetermined extent.

JOSEPH H. JOHNSON.